UNITED STATES PATENT OFFICE.

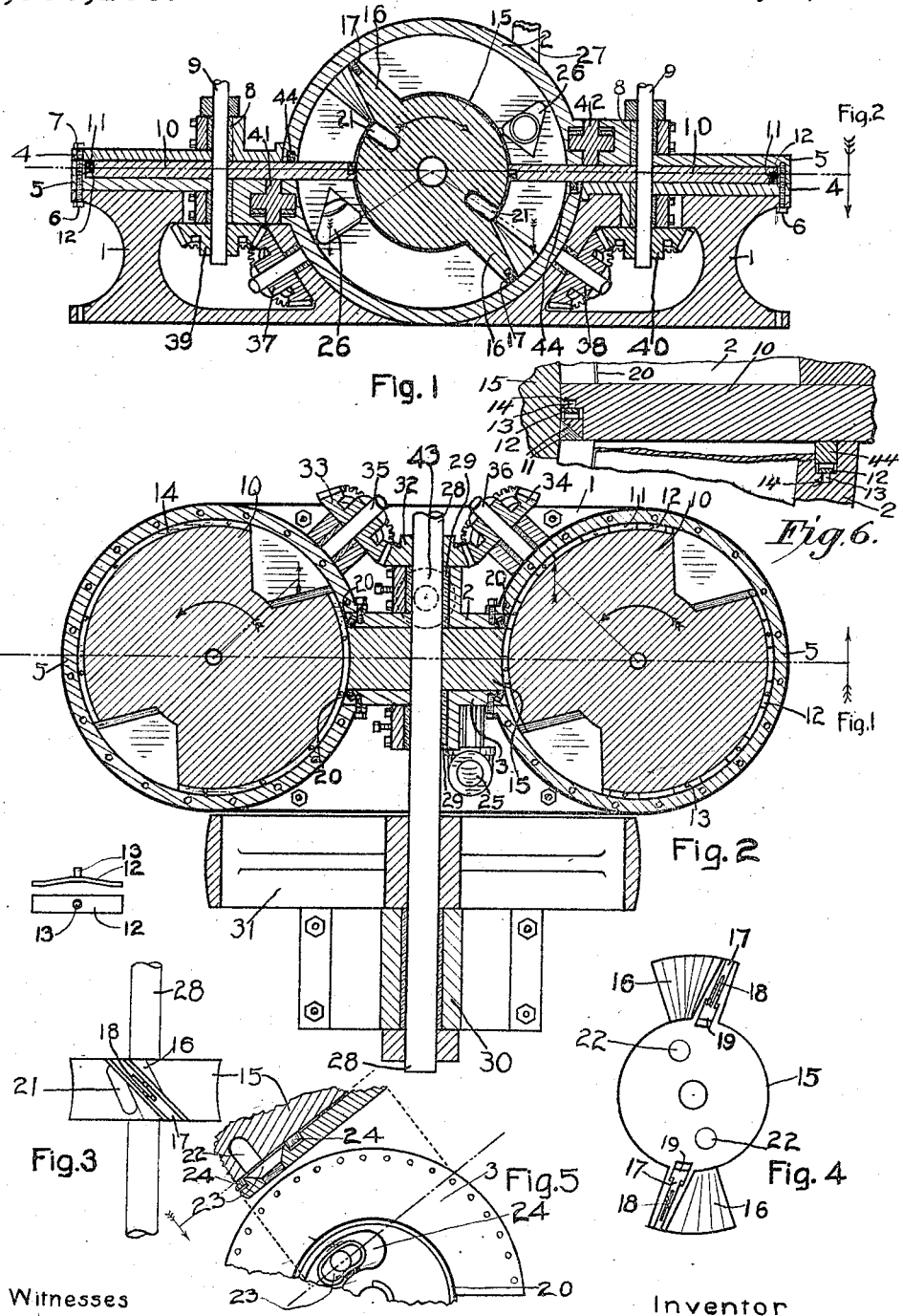

HAROLD E. LITTLE, OF TROY, NEW YORK.

ROTARY ENGINE OR PUMP.

1,305,133.　　　　　Specification of Letters Patent.　　Patented May 27, 1919.

Application filed August 31, 1917. Serial No. 189,139.

*To all whom it may concern:*

Be it known that I, HAROLD E. LITTLE, a citizen of the United States, residing at Troy, in the county of Rensselaer and State of New York, have invented a new and useful Rotary Engine or Pump, of which the following is a specification.

My invention relates to improvements in rotary engines and pumps in which a horizontally rotating piston and piston disk operate in conjunction with two or more diametrically opposite geared abutments rotating vertically; and the objects of my improvement are first, reduction in vibration of the engine or pump, and consequently a smaller foundation and lighter base, and second, the greater speed it may run in safety, and the increase in power of engine or capacity of pump, and third, the economical consumption of steam or power by making steam and water tight compartments by the use of packing rings, and fourth, the great reduction in wear of bearings on account of the absence of reciprocating parts.

I attain these objects by the mechanism illustrated in the accompanying drawing, in which Figure 1 is a vertical section of the entire engine, showing the position of the valve when viewed from the opposite side, and section of the diagonal bearings. Fig. 2 is a plan view of the engine cutting the diagonal bearings. Fig. 3 is a plan view of the piston disk and piston. Fig. 4 is a side view of the said piston and piston disk. Fig. 5 is detail view of a portion of the cylinder and a portion of the piston disk, one of the packings being shown in a sectional projection, the section being taken on the dot and dash line, and Fig. 6 is a detail view of two of the packings shown assembled with a portion of the cylinder cut away to show a packing hereinafter referred to.

Similar numerals refer to similar parts throughout the several views.

The casting 1 is so shaped to receive the cylinder 2, and cylinder disk 3, and the two parts of the two abutment casings 4, and 5, which are fastened to the base 1, by means of bolts 6, and to each other by bolts 7, around the circumference of the cases.

Within bearings 8, rotate shafts 9, fixed to abutments 10, containing packing rings 11, which are square in cross section; yet cut diagonally so that springs 12, held by dowels 13, into holes 14, press the inner part of the ring vertically, the angle of which, results in both vertical and horizontal pressure against the slot in the cylinder 2, and cylinder plate 3, and against the piston disk 15, making a steam or water tight joint in conjunction with the slot packing rings 44. On this piston disk 15, are pistons 16, containing piston rings 17, which have tongues 18, to allow end motion without leakage. Under these said rings, are springs arranged as springs 12, the heel 19, is held against rings 20, by means of steel wire springs, secured in holes drilled and tapped in pistons 16, and bearing on the top of the heel. These said rings 20, are also held against rings 11, and piston disk 15, by springs similar to springs 12.

In the piston disk 15, are holes 21, drilled radially and holes 22, drilled in the side to meet the radial holes. 23 is the hole in the cylinder plate 3, coinciding part of the revolution with the side holes, 22; around the edge of the casting hole are rings 24, making a steam and water tight valve, supplied by a pipe 25. 26, is the exhaust port, 27, the exhaust pipe connected to the exhaust port.

When the piston and piston disk fixed to shaft 28, cause the shaft to revolve in bearings 29, and pedestal bearings 30, they also cause the fly wheel 31, and bevel gear 32, to revolve with them.

This bevel gear 32, engages with bevel gears 33, and 34, causing the shafts 35, and 36, to revolve, and gears 37, and 38, to revolve also and turn shafts 9, since they engage with gears 39, and 40. Since all the gears contain the same number of teeth, the abutments on shafts 9, revolve at the same speed as the piston and piston disk. When the pistons approach near the abutments 10, the cut away part of the abutment also appears, and as the piston, the edge of which is at a 45° angle to the axis of the piston, travels vertically in one direction, the cut away portion travels perpendicular to it, so that the piston travels through the cut away part, and the abutment closes, and the port 22, comes opposite, and communicates with the opening 23, in the cylinder plate 3, thus allowing the passage of steam or water between the piston and abutment at the diametrically opposite sides of the piston disk; in the pump, the port and the opening communicate with each other during the whole revolution, and the intake pipe contains a suitable check valve, and the water emits through the exhaust pipe 27, and ports 26;

in the engine, the port and the opening communicate with each other during one half the time the abutments are closed, the other half of the time, the steam expands, and exhausts through the exhaust ports and pipes. Rolls 41, and 42, take the thrust of the abutments, rolls 43, take the end thrust of the piston.

I am aware that prior to my invention rotary engines with geared abutments operating on an axis perpendicular to the piston disk axis have been made. I therefore do not claim such a combination broadly; but

I claim:

1. In a rotary engine, a horizontally rotating abutment plate, a vertically rotating piston disk operating in a plane transversely to that of the abutment disk, a packing ring carried by the abutment disk, said ring being non-circular in cross section and split diagonally, and springs arranged to bear upon the posterior portion of the ring to force the anterior portion of the ring diagonally into a fluid-tight contact with both the piston disk and the abutment slot.

2. In a rotary engine, a cylinder, a horizontally operating drive shaft, a ported piston disk on the shaft in the cylinder, pistons on the disk arranged at an angle with respect to the axis of the disk, a pair of horizontally rotating abutment disks having openings of a substantial V-shape with walls arranged at angles with respect to the axes of the disks, to facilitate the movement of the pistons through said openings, thrust rollers coöperating with the piston and abutment disks, and packing means coöperating with the moving parts of the engine to form fluid-tight joints, said packing means including rings non-circular in cross section and split diagonally, with springs bearing on one split portion to act on the other split portion.

HAROLD E. LITTLE.

Copies of this patent may be obtained for five cents each, by addressing the "Commissioner of Patents, Washington, D. C."